United States Patent [19]
Greenhill

[11] 4,021,998
[45] May 10, 1977

[54] SELF PROPELLED LAWN EDGING SHEARS

[75] Inventor: Ronald Greenhill, Port Credit, Canada

[73] Assignee: Lawrence Peska Associates, Inc., New York, N.Y.

[22] Filed: May 24, 1976

[21] Appl. No.: 689,565

[52] U.S. Cl. .................................. 56/241; 30/253
[51] Int. Cl.² ...................................... A01D 53/12
[58] Field of Search .................... 56/239, 240, 241; 30/253

[56] References Cited
UNITED STATES PATENTS

| | | |
|---|---|---|
| 361,911 | 4/1887 | Weston ................................ 56/241 |
| 2,445,842 | 7/1948 | Trevino ................................ 56/241 |
| 2,776,535 | 1/1957 | Branske ................................ 56/241 |
| 2,957,297 | 10/1960 | Zoetemelk ............................ 56/240 |
| 3,496,710 | 2/1970 | Smith et al. .......................... 56/241 |

Primary Examiner—Russell R. Kinsey

[57] ABSTRACT

Self-propelled lawn edging shears are disclosed comprising shears mounted at the bottom of a first shaft, a second shaft being mounted parallel to the first shaft for operatively engaging the shears and for driving a wheel positioned at the bottom of the first and second shaft, through a ratchet and pawl arrangement whereby the wheel is driven only on the upward stroke of the second shaft in which the jaws of the shears are opened.

6 Claims, 3 Drawing Figures

U.S. Patent    May 10, 1977    4,021,998
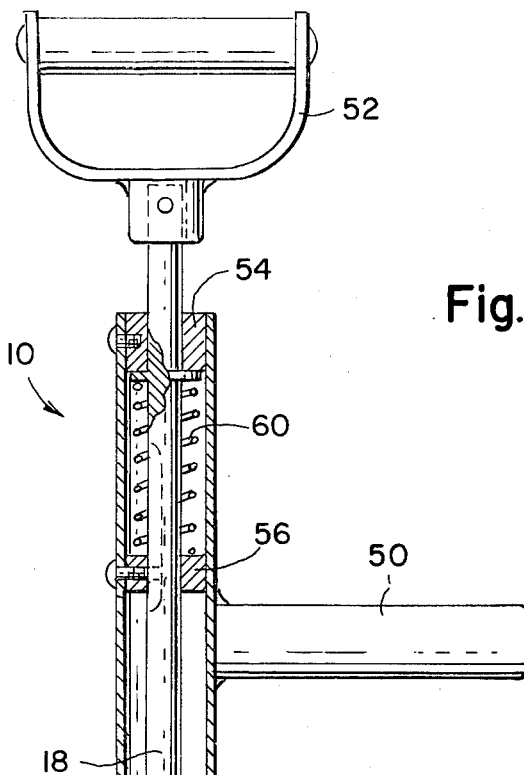
Fig. 1
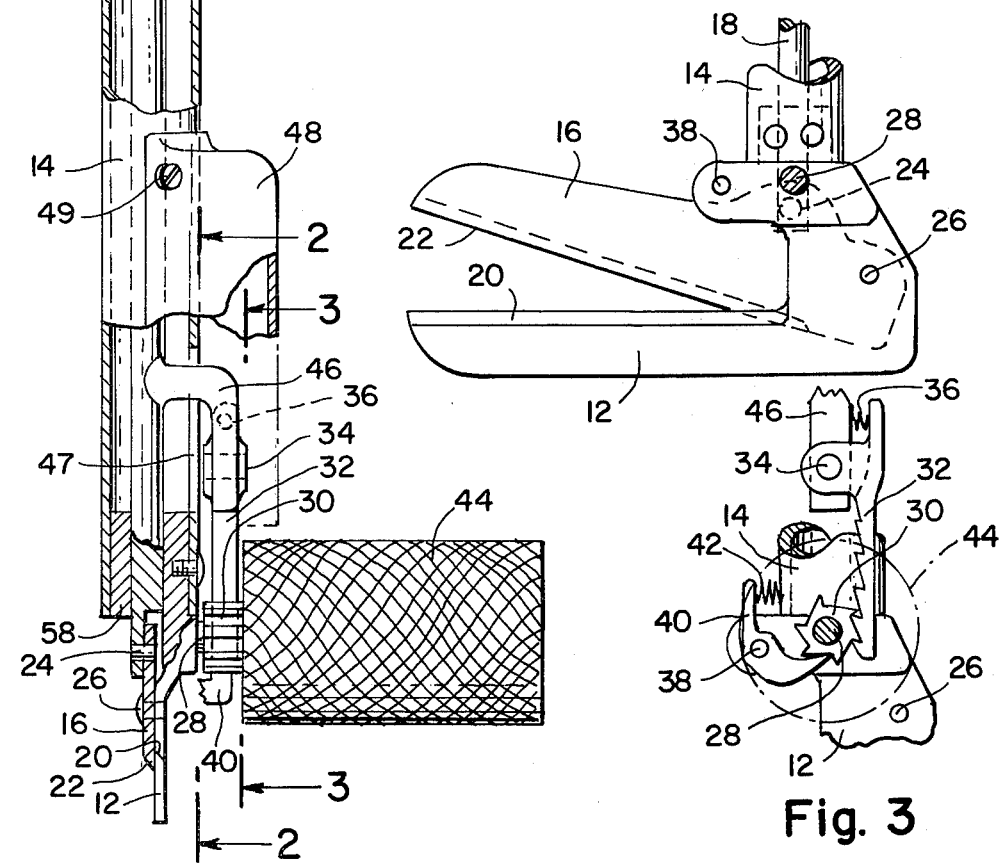
Fig. 2
Fig. 3

SELF PROPELLED LAWN EDGING SHEARS

SUMMARY OF THE INVENTION

The present invention relates to self-propelled lawn edging shears comprising a stationary shearing blade having a cutting edge thereon, the stationary blade being secured to a first shaft so that the cutting edge of the stationary blade faces substantially towards the first shaft. A movable shearing blade having a cutting edge thereon is pivotally positioned with respect to the first shearing blade so that the cutting edge of the movable shearing blade shearingly engages the cutting edge of the stationary blade. A second shaft runs longitudinally to and is slideably secured to the first shaft and extends substantially the full length of the first shaft. One end of the second shaft is pivotally secured to the shearing blade to close the shears when the second shaft is moved towards the stationary shearing blade. The other end of the second shaft terminates in a handle for grippably receiving fingers, a resilient member being secured to the first shaft and the second shaft for resiliently biasing the first shaft to the second shaft. A wheel is rotatably mounted on the first shaft, the axis of the wheel being transverse to the cutting plane of the stationary shearing blade. A ratchet is operatively connected to the wheel, a driving pawl being pivotally connected to the end of the second shaft and operatively engaging a ratchet to rotate the wheel and propel the shears in the direction of the cutting action of the shears when the second shaft is operated to open the shears.

In another embodiment, the second shaft is resiliently biased to the first shaft for returning the second shaft upwardly by a return biasing force applied to the resilient member when the second shaft is moved downwardly towards the fixed shearing blade. The return biasing force is sufficient to turn the wheel through the driving pawl and the ratchet.

In yet another embodiment, the ratchet comprises a ratchet wheel axially and drivingly connected to the wheel and the driving pawl comprises a longitudinal pawl having a plurality of teeth thereon for operatively engaging the ratchet wheel. The teeth are resiliently biased to engage the ratchet wheel through a driving pawl resilient member operatively connected to the driving pawl and the second shaft.

In another embodiment, an anti-reversing pawl is pivotally mounted on the shears and operatively engages the ratchet wheel to prevent the ratchet wheel from rotating in a direction opposite that in which the wheel is driven by the driving pawl and the ratchet wheel.

In another embodiment, the wheel comprises a cylindrical wheel axially extending transversely away from the fixed cutting blade.

The first shaft may comprise a tube, the second shaft being slideably mounted in the tube on anti-friction means such as nylon bushings or bearing or other anti-friction materials well known in the art. The driving pawl extends outwardly from the second shaft through an opening in the bottom of the tube. The resilient member comprises a coil spring in the tube and surrounds the second shaft. A second handle is provided on the tube for grippably receiving fingers. A housing extends over the opening in the bottom of the tube and downwardly towards the ratchet wheel to envelop the driving pawl.

OBJECTS OF THE INVENTION

Lawn edging shears are disclosed in the prior art U.S. Pat. No. 3,496,710 Smith, et al.; U.S. Pat. No. 3,326,299 Foo; U.S. Pat No. 3,126,968 Booth; U.S. Pat. No. 3,046,722 Bridegum; U.S. Pat. No. 2,968,905 Woolf; U.S. Pat. No. 2,776,535 Beranske U.S. Pat. No. 2,519,174 Kaves; U.S. Pat. No. 2,568,468 Smith; U.S. Pat. No. 2,445,842 Trevino; and U.S. Pat. No. 1,348,847 Browning.

In some of the prior art devices such as the Trevino reference (supra), a downward force is applied to a pair of lawn edging shears through a handle, the handle also being operatively connected to a wheel for driving the wheel as the downward force is applied. The disadvantage of the Trevino device resides in the application of downward force not only to drive the lawn edging shear forward but also to close the blades of the shear. In certain cutting operations the full force of the downward stroke is often needed to cut through rather thick sections of grass and extra effort is required in order to develop this force since part of the downward force is dissipated in the driving force needed to rotate the wheel propelling the lawn edge trimmer. Additionally, the device of Trevino discloses a driving mechanism that is exposed to soil, pebbles and the like.

It is therefore an object of the present invention to overcome these and other difficulties encountered in the prior art.

It is a further object of the present invention to provide a self-propelled lawn edging shear.

It is another object of the present invention to provide a self-propelled lawn edging shear in which the downward force applied to close the shear jaws can be used for cutting and a reverse biasing force developed for opening the jaws of the shears to propel the shears in a forward direction on the opening of the jaws.

These and other objects have been achieved according to the present invention and will become apparent from the disclosure and claims that follow as well as the appended drawing.

BRIEF DESCRIPTIONS OF THE DRAWINGS

FIG. 1 is a front elevation of the invention with portions broken away and shown in section;

FIG. 2 is an enlarged sectional view taken along line 2—2 of FIG. 1; and

FIG. 3 is a sectional view taken along line 3—3 of FIG. 1.

DETAILED DESCRIPTION

Referring to the drawing, self-propelled lawn edging shears 10 are illustrated having a stationary shearing blade 12 with a cutting edge 20 thereon and a movable shearing blade 16 having a cutting edge 22 thereon, blade 16 being pivotally connected to blade 12 through pivot pin 26. Blade 12 is secured to tube 14. A shaft 18 extending the length of tube 14 is inserted therein and is operatively connected to movable blade 16 through pivot pin 24. A wheel 44 is axially mounted on shaft 28 secured to blade 12 and has a ratchet wheel 30 thereon which is drivingly engaged by a longitudinal pawl 32 pivotally secured to arm 46 extending from shaft 18 by means of a pivot pin 34. Pawl 32 is resiliently biased into engagement with ratchet wheel 30 by means of a coil spring 36. An anti-reversing pawl 40 is pivotally secured through pivot pin 38 to the upper portion of stationary blade 12, pawl 40 being resiliently biased into engagement with ratchet wheel 30 by means of coil spring 42.

An opening 47 is provided in the base of the tube 14 so that the arm 46 extending from shaft 18 may move upwardly and downwardly in the opening, and a removable housing 48 (secured to tube 14 by means of screw fastener 49) projects downwardly over the opening 47 to surround the ratchet 32 and the arm 46. Handle 50 is secured to the side wall of tube 14 whereas handle 52 is secured to the end of shaft 18. A resilient member such as a coil spring 60 is secured at one end to the tube 14 and at the other end to the handle 18 to resiliently bias shaft 18 upwardly when a downward force is applied to the shaft 18 by means of handle 52. Anti-friction member such as bearings 54, 56 and 58 are positioned in the tube 14 such as nylon bearings or other anti-friction materials well known in the art.

In use, the blades 12 and 16 are positioned along a portion of a lawn that is to be edged, handles 50 and 52 grippably engaged by fingers and pressure applied downwardly on handle 52 to transmit a downward force to the cutting blade 16 thereby shearingly engaging the cutting edges 22 and 20 of shearing blade 16 and 12, respectively. A return biasing force is simultaneously applied to the resilient member 60 so that upon release of the downward force on handle 52, shaft 18 will return automatically to an upward position and in so doing ratchet 32 will engage pawl 30 to rotate the wheel 44 in a direction towards the cutting action of the shear blades 12 and 16. Anti-reversing pawl 40 prevents wheel 44 from being rotated in any other direction but the cutting direction of blades 12 and 16.

Although the invention has been described by reference to some embodiments, it is not intended that the novel self-propelled lawn edging shears be limited thereby but that modifications thereof are intended to be included as falling within the broad scope and spirit of the foregoing disclosure, the following claims and the appended drawing.

What is claimed is:

1. Self-propelled lawn edging shears comprising stationary shearing blade means having a cutting edge thereon and secured to first shaft means so that the cutting edge of said stationary blade means faces substantially towards said first shaft means, movable shearing blade means having a cutting edge thereon and pivotably positioned with respect to said first shearing blade means so that the cutting edge of said movable shearing blade shearingly engages the cutting edge of said stationary shearing blade, second shaft means longitudinally and slideably secured to said first shaft means, said second shaft means extending substantially the full length of said first shaft means, one end of said second shaft means being pivotally secured to said movable shearing blade means to close said shears when said second shaft means is moved towards said stationary shearing blade means, the other end of said second shaft means terminating in first handle means for grippably receiving fingers, resilient means secured to said first shaft means and said second shaft means for resiliently biasing said first shaft means to said second shaft means, wheel means rotatably mounted on said first shaft, the axis of said wheel means being transverse to the cutting plane of said stationary shearing blade means, ratchet means operatively connected to said wheel means, driving pawl means pivotally connected to the end of said second shaft means and operatively engaging said ratchet means to rotate said wheel means to propel said shears in the direction of the cutting action of said shears when said second shaft is operated to open said shears.

2. The lawn edging shears of claim 1 where said second shaft means is resiliently biased to said first shaft means for returning said second shaft upwardly by a return biasing force applied to said resilient means when said second shaft means is moved downward towards said fixed shearing blade means, said return biasing force being sufficient to turn said wheel means through said driving pawl means and said ratchet means.

3. The lawn edging shears of claim 2 where said ratchet means comprises a ratchet wheel axially and drivingly connected to said wheel means and said driving pawl means comprises a longitudinal pawl having a plurality of teeth thereon for operatively engaging said ratchet wheel, said teeth being resiliently biased to engage said ratchet wheel through driving pawl resilient means operatively connected to said driving pawl means and said second shaft means.

4. The lawn edging shears of claim 3 further comprising anti-reversing pawl means pivotally mounted on said shears and operatively engaging said ratchet wheel means to prevent said wheel means from rotating in a direction opposite that in which said wheel means is driven by said driving pawl means and said ratchet wheel means.

5. The lawn edging shears of claim 4 where said wheel means comprises a cylindrical wheel axially extending transversely away from said fixed cutting blade means.

6. The lawn edging shears of claim 5 where said first shaft means comprises a tube, said second shaft being slideably mounted in said tube on anti-friction means, said driving pawl extending outwardly from said second shaft means through an opening in the bottom of said tube, said resilient means comprising a coil spring in said tube surrounding said second shaft, second handle means on said tube for grippably receiving fingers, housing means extending over said opening in said tube and downwardly towards said ratchet wheel.

* * * * *